United States Patent

[11] 3,571,653

[72] Inventors Robert B. Hansen
Arlington Heights;
James P. McShane, Jr., Chicago, Ill.
[21] Appl. No. 661,666
[22] Filed Aug. 18, 1967
[45] Patented Mar. 23, 1971
[73] Assignee Motorola, Inc.
Franklin Park, Ill.

[54] HORIZONTAL PINCUSHION CORRECTION CIRCUIT

7 Claims, 3 Drawing Figs.

[52] U.S. Cl. 315/24, 315/27
[51] Int. Cl. H01j 29/76
[50] Field of Search 315/27, 276 (DC)

[56] References Cited
UNITED STATES PATENTS
2,758,248 8/1956 Garrett et al. 315/276DC
2,842,709 7/1958 Lufkin 315/276DC

*Primary Examiner*—Rodney D. Bennett, Jr.
*Assistant Examiner*—Joseph G. Baxter
*Attorney*—Mueller & Aichele

ABSTRACT: The circuit includes means to develop a parabolic signal at the vertical sweep frequency for controlling the bias on the output device in the horizontal sweep system. The polarity of the signal is such as to cause increasing conduction of the device towards the top and bottom of the raster and since the output device mainly controls scan on the right side of the raster, this serves to increase distortion on the right side in order to approach the greater distortion which normally appears on the left side. The circuit further includes means to simultaneously correct the distortion on both sides and straighten the raster.

Inventors
ROBERT B. HANSEN,
JAMES P. McSHANE Jr.
BY Mueller, Aichele & Rauner
ATTYS.

HORIZONTAL PINCUSHION CORRECTION CIRCUIT

BACKGROUND OF THE INVENTION

The use of wide deflection angle cathode ray tubes that have a relatively flat rectangular viewing screen result in a distortion of the raster of the type known as pincushion distortion. Such distortion is usually corrected in black and white receivers by modifying the deflection yokes to provide nonsymmetrical sweep when substantial linear sawtooth waves are applied thereto. However, with the relatively complicated deflection system for a tri-gun cathode ray tube of the type used in color television receivers, it is desireable to avoid introducing any nonsymmetrical convergence errors, so that essentially linear field yokes are desirable. This requires that pincushion distortion be corrected by modifying the wave generated in the deflection system rather than by modification of the yoke structure. A number of circuits have been proposed to correct for raster distortion in multibeam cathode ray tubes which require substantial linear deflection by dynamically varying one deflection wave with a signal derived from the other deflection wave. In the instance of distortion of the sides of the raster, the horizontal deflection wave may be made to scan at different widths in response to a parabolic wave derived from the vertical deflection system. In the past, such circuits have been one or two types. First, the bias on the horizontal output device is modified by a parabola at the vertical sweep frequency to provide decreasing conduction of the device towards the top and the bottom of the raster to thereby straighten the inward bending at the sides. Or, secondly, the impedance of a device coupled in series with the horizontal deflection yoke may be parabolically changed at the vertical sweep frequency to provide decreasing scan width towards the top and bottom, again to straighten the sides. However, the results produced by such circuits have not been entirely satisfactory because the physical characteristics of the cathode ray tube and the deflection yokes are such as to cause more distortion or inward bending of the left side of the raster, whereas the first of the above-described circuits provides more correction for the right side so that if the amplitude is sufficient to straighten the left side, the right side will bend outwards, or if sufficient amplitude is provided to straighten the right side, the left side will remain inwardly bent. In the second of the above-described circuits, since both sides are simultaneously corrected, and since such a circuit inherently provides more right-side correction, either the left side will remain bent inwardly or the right side will become bent outwardly.

SUMMARY OF THE INVENTION

It is accordingly an object of the present invention to provide an improved circuit for dynamic correction of the pincushion distortion on the sides of the raster of the viewing screen of the cathode ray tube.

Another object of the invention is to substantially eliminate distortion on both sides of the raster by first predistorting one side and then simultaneously straightening both sides.

In practicing the invention, a cathode ray tube in a television receiver and the horizontal yoke for deflecting a beam thereof have characteristics to cause a first side portion of the raster to bend inwardly to a greater extent than a second side portion thereof. A current supply circuit includes means for applying an initial portion of a sawtooth current signal to the horizontal yoke for sweeping the cathode ray beam across the first side portion. The supply circuit further includes an electron control device for applying a terminal portion of the sawtooth current signal to the horizontal yoke for sweeping the beam across the second side portion. A pincushion correction circuit includes means coupled from the vertical sweep system to the electron control device to develop a parabolic signal at the vertical sweep frequency of a polarity with respect to the conductivity of the device to parabolically increase the terminal portion of the sawtooth current towards the top and bottom of the raster to thereby increase the inward bending of the second side portion. The correction circuit further includes means coupled to the horizontal sweep system to simultaneously tend to bend both side portions outwardly.

DETAILED DESCRIPTION OF THE PREFERRED EMBODIMENT

Figures 1, 2, 3:
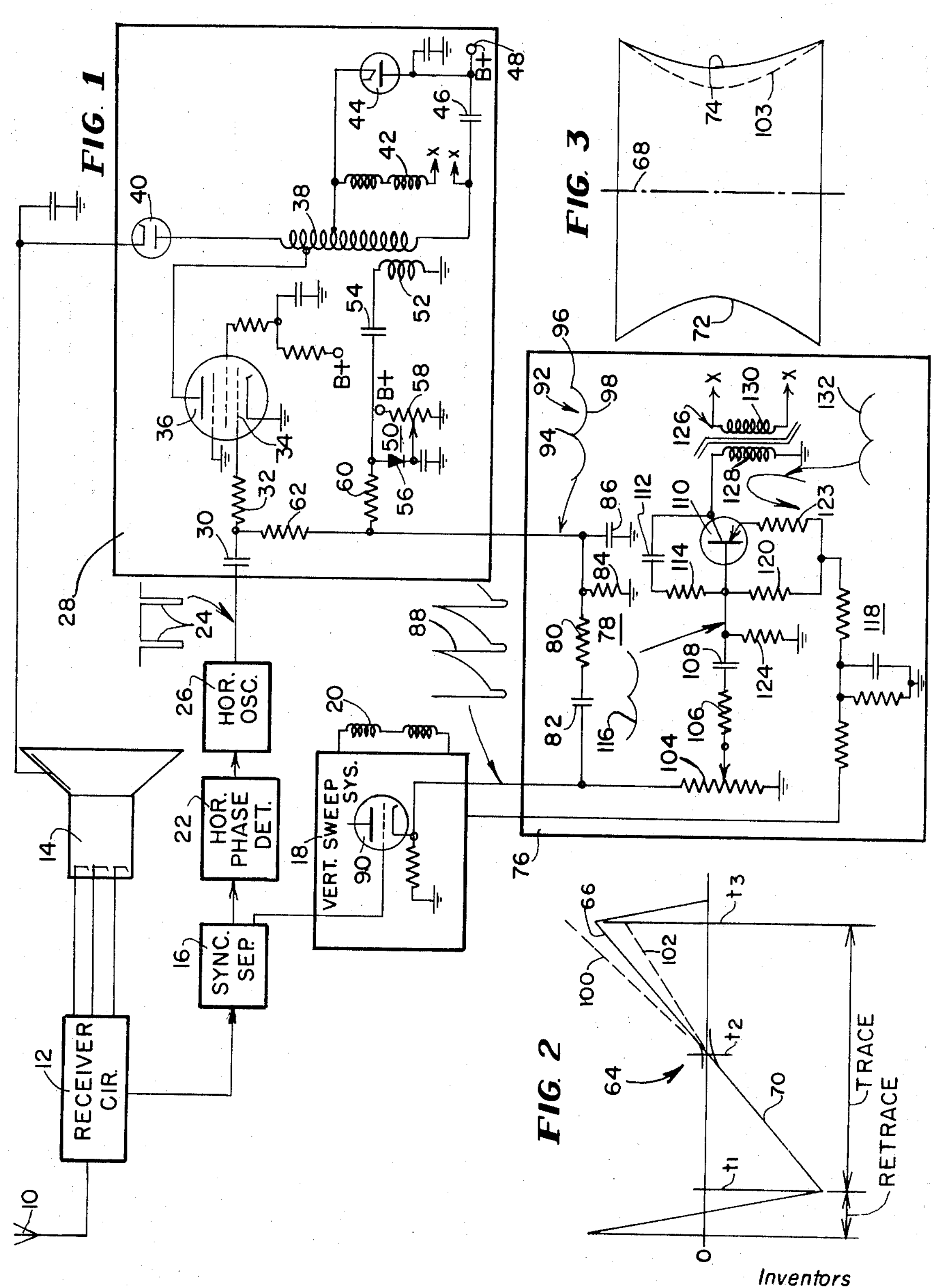
FIG. 1 illustrates a television receiver partially in block and partially in schematic illustrating the features of the invention.
FIG. 2 illustrates the sawtooth current in the horizontal yoke of FIG. 1.
FIG. 3 illustrates a raster which appears on the viewing screen of the cathode ray tube of FIG. 1.

Referring now to the television screen of FIG. 1, a television signal is received by antenna 10 and processed in a known manner by a receiver circuit 12 to produce video information for a multigun cathode ray tube 14. Vertical synchronizing signals are separated from the video information in a synchronizing signal separator circuit 16 and are applied to a vertical sweep system 18 which develops a sawtooth current for application to the vertical yoke 20 disposed on the neck of the cathode ray tube 14 for vertically deflecting the cathode ray beams. Horizontal synchronizing signals separated from the video information in circuit 16 are coupled to horizontal phase detector 22 which in turn develops a control voltage for controlling the frequency of the negatively poled horizontal pulses 24 from oscillator 26.

The horizontal output system 28 includes a coupling capacitor 30 and a resistor 32 connected in series between the horizontal oscillator 26 and the control grid 34 of an electron control device such as a vacuum tube pentode 36, the cathode of which is grounded. The anode of tube 36 is coupled to a tap on autotransformer 38 the uppermost end of which is coupled to a diode 40 which rectifies the horizontal pulses to provide the high voltage for the final anode of cathode ray tube 14. A horizontal yoke 42 is coupled in series at $x$–$x$ with a saturable reactor (to be explained hereinafter) and the lower portion of the autotransformer 38. A damper diode 44 and a boost capacitor 46 are coupled in series across said lower portion of the autotransformer and a DC voltage supply is coupled to the junction of the diode 44 and the capacitor 46.

A bias network 50 for tube 36 includes an auxiliary winding 52 of transformer 38 coupled through a capacitor 54 to the anode of a diode 56. A potentiometer 58 provides a reference voltage for the cathode of diode 56. The negative pulses across winding 52 are rectified by diode 56 and are coupled through a pair of resistors 60 and 62 and resistor 32 to provide a negative quiescent bias voltage for the control grid 34 of tube 36.

To explain the operation of the horizontal output system 28, reference is made to FIG. 2 illustrating the sawtooth current signal 64 which flows through the yoke 42 and as shown, includes a trace portion to sweep the cathode ray beams across the screen of the cathode ray tube 14 for depicting the video information. The signal also includes a retrace portion to rapidly return the cathode ray beams to the left side of the screen to commence a new trace portion. Starting from time $t_2$, the bias provided by network 50 is sufficient to turn the tube 36 on to conduct a linearly increasing current through yoke 42 to form what will be referred to as the terminal portion 66 of the sawtooth current signal 64. The peak of the terminal portion 66 will determine the width of the raster on the right side relative to an imaginary vertical axis 68 (FIG. 3) between the right and left sides of the raster. When a negative pulse 24 from the horizontal oscillator 26 is impressed on the control grid 34, the tube 36 cuts off so that the yoke 42 is free to oscillate with the system capacity to cause the yoke current to swing from its maximum positive value to its maximum negative value and thereby form the retrace portion of the signal 64. At time $t_1$ when retrace has been completed, the damper diode 44 begins to conduct to prevent further oscillation and to conduct linearly increasing current into the yoke 42 to form what will be referred to as the initial portion 70 of the sawtooth current signal 64. The negative peak of the initial portion 70 will determine the width of the raster on the left side relative to the vertical axis 68. It should be noted that the pulse 24 maintains the tube 36 cut off for retrace and a substantial portion of trace here shown to be 50 percent. This is due to the duration of the pulse and/or the characteristics of the tube itself in recovering from turnoff. Thus the circuit to supply a sawtooth current through the yoke 42 broadly includes the tube 36 to conduct the terminal portion of the current, and the damper diode 44 to conduct the initial portion of the current.

FIG. 3 illustrates a raster depicted on the screen of the cathode ray tube 14. It will be assumed that the television receiver includes sufficient vertical correction to provide the straight top and bottom shown, with no side correction, the sides of the raster bend parabolically inward as indicated by the heavy lines, this characteristic being known as horizontal pincushion distortion. Due to the nonuniform characteristics of present day cathode ray tubes and horizontal deflection yokes, the left side 72 of the raster has a tendency to bend inwardly to a greater extent than the right side 74.

In the past, one method of correcting this distortion involved parabolically decreasing the bias on the tube 36 towards the top and bottom of the raster to thereby decrease the scan width at the top and bottom. However, as explained previously, the current for the right-side portion of the raster between the axis 68 and the right side 74 is provided by the tube 36 so that changing its bias will only slightly tend to straighten the left side 72. And if the degree of bias change is sufficient to straighten the left side, the right side would bend outwardly. A second presently known method of correcting horizontal pincushion distortion involves changing the impedance of a device coupled in series with the yoke 42 at a vertical parabolic rate. This corrects both sides simultaneously but due to the nonuniform characteristics of the horizontal deflection yoke and the cathode ray tube, the left side 72 remains bent inwardly or the right side becomes bent outwardly. In addition, rectification of the horizontal pulses by the diode 40 to provide the high voltage for the cathode ray tube 14 occurs primarily during the retrace and initial portions of the signal 64. Thus, in this second method, the loading on the yoke 42 at the left-hand side of the raster is a maximum to further decrease the left-side scan width relative to the right side.

To overcome these shortcomings, the pincushion correction circuit 76 is provided and includes an integrating network 78 which is comprised of a resistor 80 and a capacitor 82 coupled in series, and resistor 84 and a capacitor 86 coupled in parallel to ground. A trapezoidal signal 88 which appears on the cathode or the vacuum tube 90 in the vertical sweep system 18 in converted by the integrating network 78 into a parabolic signal 92 and coupled to the junction of resistors 60 and 62 to control the bias on tube 36. It is important to note that the parabolic waveform 92 is at a 60 cycle rate whereas the pulses 24 are a 15,750 c.p.s. rate. Thus at the top and bottom of the raster respectively corresponding to points 94 and 96 of the signal 92, the bias on the control grid 34 will be a minimum negative value to provide maximum conduction of the tube 36 and therefore provide a terminal portion yoke current 100 (FIG. 2) having a maximum slope to provide maximum scan width at the top and bottom. At the middle of the raster corresponding to point 98 on the signal 92, the bias will be a maximum negative value to provide minimum tube conduction and therefore provide a terminal portion yoke current 102 having a minimum slope to provide minimum scan width at the middle. Since changing the bias affects the current supplied by the tube 36 to a much greater extent than the current supplied by the damper diode, the initial portion 70 of the sawtooth current would only slightly be affected and therefore only the scan width of the right-side portion of the raster will change at a vertical rate. As shown in FIG. 3, the right side of the raster is now defined by dashed lines 103 and as can be seen has a similar shape to the left-hand side. Although the left side 72 will be affected to some degree by a change in bias on the tube 36, for the sake of simplicity, no change is indicated. By judiciously selecting the amplitude of the parabolic signal 92, the left and right sides may be made to be equally distorted.

The pincushion correction circuit 76 includes a means to straighten both sides of the raster simultaneously. A potentiometer 104 is coupled from the cathode of the vacuum tube 90 in the vertical sweep system 18 to ground with a tap thereof coupled through an integrating network including a resistor 106 and a capacitor 108 coupled in series to the base of a PNP transistor 110. A capacitor 112 and a resistor 114 are coupled in series between the collector and base of the transistor 110 which due to the transistor gain provides the necessary large shunt capacity for the integrating network. The integrating network converts the trapezoidal signal 88 from vertical sweep system 18 into a parabolic signal 116. A DC voltage derived from a circuit in the vertical sweep system 18 is coupled through a filtering network 118 and applied to a pair of resistors 120 and 123 to bias transistor 110 in operation. A resistor 124 provides a DC return for the base. A saturating transformer 126 has its primary winding 128 coupled from the collector of transistor 110 to ground. A secondary winding 130 is coupled in series with the yoke 42 in horizontal output system 28 at points *x–x*. The parabolic current 132 flowing through primary winding 128 in response to the parabolic signal 116 causes the impedance of the secondary winding 130 to change at a parabolic rate corresponding to the shape of the sides 72 and 103 of the raster of FIG. 2. That is, at the middle of the raster the impedance is a minimum so that the sawtooth current in the yoke 42 has a maximum value, and the impedance at the top and bottom of the raster is a maximum to minimize the sawtooth current. Since the impedance affects both the initial and terminal portions 70 and 66 of sawtooth current signal 64 of FIG. 2, the minimum current at the top and bottom decreases the scan width, or bends the sides inwardly on both the right and left side. Also, the maximum current at the middle of the raster increases the scan width or bends the sides outwardly again on both sides.

Of course the operation just explained may be viewed in the reverse order, that is first simultaneously correcting both sides to a sufficient degree to straighten the left side and bend the right side outwardly. The parabolic bias control of the tube 36 will then affect the right side to straighten it.

What has been described therefore is an improved horizontal pincushion circuit where the right-hand side of the raster is first predistorted in order to make its appearance similar to the left-hand side and then simultaneously undistorting both sides. This is an improvement over what has been done in the past where simultaneous correction of both sides has been attempted but unsatisfactorily because of the characteristics of the cathode ray tube and the horizontal yoke.

We claim:

1. In a television receiver having a cathode ray tube, horizontal and vertical yokes for deflecting an electron beam thereof to form a raster having a top, a bottom and first and second side portions, the cathode ray tube and the horizontal yoke having characteristics to cause the first side portion to bend inwardly to a greater extent than the second side portion, a vertical sweep system for applying sweep signals at a vertical frequency to the vertical yoke, a horizontal sweep system including in combination; a current supply circuit including first circuit means coupled to the horizontal yoke for applying an initial portion of a sawtooth current signal to the horizontal yoke for sweeping the beam across the first side portion of the raster, the supply circuit further including an electron control device for applying a terminal portion of the sawtooth current signal to the horizontal yoke for sweeping the beam across the second side portion, second circuit means coupled between the vertical sweep system and said electron control device to develop a parabolic signal at the vertical frequency of a polarity with respect to the conductivity of said electron control device to parabolically increase the conduction of said device towards the top and bottom of the raster, to thereby increase the inward bending of the second side portion, and means coupled to the horizontal sweep system to simultaneously straighten both side portions by a substantially equal amount.

2. The television receiver set forth in claim 1 wherein the vertical sweep system includes third circuit means to supply an output signal at the vertical sweep frequency, said second circuit means being coupled to said third circuit means and including an integrating circuit to convert said output signal into said parabolic signal.

3. The television receiver set forth in claim 2 wherein said integrating circuit includes resistor means and capacitor means coupled in series between said third circuit means and a reference potential, and means coupling the junction of said resistor means and capacitor means to said electron control device.

4. The television receiver set forth in claim 1 wherein said electron control device includes a vacuum tube having a control grip coupled to said second circuit means, with said parabolic signal having a minimum value at the center thereof and maximum values at the ends thereof.

5. The television receiver set forth in claim 1 wherein said horizontal sweep system further including a bias circuit coupled to said electron device to provide a quiescent direct current voltage therefor, with said parabolic signal from said second circuit means changing said voltage at a parabolic rate.

6. The television receiver set forth in claim 1 wherein said first circuit means includes a damper diode effectively coupled across said electron control device and poled to conduct current in a direction opposite to said device.

7. The television receiver set forth in claim 1 wherein said means to simultaneously straighten both side portions includes a saturable inductor coupled in series with the horizontal yoke, and third circuit means coupled between the vertical sweep system and said inductor and including an integrating network to parabolically change the inductance thereof at the vertical frequency.